(12) United States Patent
Yamagishi et al.

(10) Patent No.: US 6,234,011 B1
(45) Date of Patent: May 22, 2001

(54) VEHICLE TESTING APPARATUS AND METHOD THEREOF

(75) Inventors: Wataru Yamagishi, Abiko; Toshihiko Horiuchi, Ushiku; Makoto Yamakado, Tsuchiura; Masaharu Sugano, Inashiki-gun, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/120,729

(22) Filed: Jul. 23, 1998

(30) Foreign Application Priority Data

Jul. 24, 1997 (JP) .................................................. 9-198187

(51) Int. Cl.[7] .................................................. G01M 19/00
(52) U.S. Cl. ..................... 73/118.1; 73/570; 73/11.06; 73/118.1
(58) Field of Search ............................. 73/121, 129, 146, 73/118.1, 570, 11.06

(56) References Cited

U.S. PATENT DOCUMENTS

| 4,502,327 | * | 3/1985 | Scrivener et al. ...................... 73/146 |
| 5,038,605 | * | 8/1991 | Tews et al. ............................. 73/129 |
| 5,239,486 | * | 8/1993 | Mortier .................................. 73/121 |
| 5,402,676 | * | 4/1995 | Shibayama et al. ................. 73/118.1 |

FOREIGN PATENT DOCUMENTS 9-43109   2/1997 (JP) .

* cited by examiner

*Primary Examiner*—Max Noori
*Assistant Examiner*—Maurice Stevens
(74) *Attorney, Agent, or Firm*—Evenson, McKeown, Edwards & Lenahan, P.L.L.C.

(57) ABSTRACT

A simulation apparatus for simulating vehicle movement during actual running has a mock vehicle that is provided with a truck and a vibrator, and a numerical model that is virtually connected to the mock vehicle and stored in a digital computer. Wheels are joined to the bottom portion of the truck, and a driving machine for rotationally driving the wheels is provided under the wheels. The driving machine drives the wheels in such a manner as to simulate a running surface such as a road or rails. The rotation of the wheels causes the truck to generate reaction force. A reaction force measuring device measures this reaction force. Based on a resulting measurement value and the numerical model stored in the digital computer, the digital computer calculates a vehicle movement after a lapse of a preset time. A controller controls the vibrator so as to realize the calculated vehicle movement.

12 Claims, 11 Drawing Sheets

VEHICLE TESTING APPARATUS AND METHOD THEREOF

BACKGROUND OF THE INVENTION

The present invention relates to an apparatus and a method for testing the performance of a railroad vehicle or an automobile and, more specifically, to an apparatus and a method for testing a truck of a railroad vehicle or a suspension of an automobile.

Since the truck of a railroad vehicle and the suspension of an automobile are important parts that determine the degree of comfortability of a ride in the vehicle and the stability during running, it is necessary to evaluate the performance of the truck or suspension before the development of a vehicle. In particular, there is a possibility that a truck may make a snake action during high-speed running. It is an important subject to avoid the snake action.

At present, tests are conducted by using an actual truck to clarify how the phenomenon of snake action occurs during running of a vehicle, because it is difficult to analyze the snake action by computer simulation mainly for the following reasons:

(1) It is difficult to analyze the contact surfaces between the wheels and the rails.

(2) Trucks have many structure-related nonlinear factors.

Among the tests using an actual truck is what is called an actual vehicle test in which an actual vehicle is run on actual rails. On the other hand, an on-base test is also conducted in which a truck is mounted on rail wheels. In the on-base test, a plurality of wheels are rotatably joined to the bottom portion of a truck and a weight frame having a weight corresponding to that of a vehicle is mounted on the top-surface side of the truck. The wheels, the truck, and the weight frame simulate a railroad vehicle. On the other hand, to simulate railroad rails of infinite length, a plurality of cylindrical rollers are rotatably provided on a base. The wheels provided at the bottom of the truck and the cylindrical rollers are located at positions that correspond to each other. The running characteristics of the railroad vehicle on rails can be simulated by mounting a mock vehicle on the rollers and rotating the rollers with one end of the truck fixed to a coupler. An example of such a testing apparatus is described in Hirotsu et al., "Simulation of Snake Action of Railroad Vehicles," Transactions of the Japan Society of Mechanical Engineers, Vol. 532 Ed. C, No. 90-0204A, pp. 65–72, December 1990.

However, in the above conventional actual vehicle test, the results of each test is are results obtained one combination of conditions (such as a vehicle structure, rail states, and running conditions). Since the actual vehicle test involves a number of parameters, it is difficult to determine the running performance and the degree of comfortability of a ride under another combination of conditions based on the experimental results obtained. In the on-base test, since the mock vehicle is bound by the coupler, relative positions of a vehicle in the running direction are determined in accordance with whether the wheels are rotating in the normal or reverse direction. However, in this case, it is difficult to take the characteristics of the vehicle into account, and the motion of the mock vehicle is different from that of an actual vehicle. Therefore, satisfactory test results cannot be obtained. Further, trucks having an active damper that have been developed in recent years require that a movement state be fed back as a feedback signal. Therefore, there is a problem that the on-base test cannot accommodate such trucks.

SUMMARY OF THE INVENTION

The present invention has been made in view of the above problems in the art, and an object of the invention is therefore to enable a performance test, or a durability test mainly on a truck of a railroad vehicle, to be conducted easily while conditions are changed in various manners.

Another object of the invention is to conduct a test that simulates an actual railroad vehicle or automobile with high accuracy by combining a computer simulation and a model test.

A further object of the invention is to conduct, on a truck of a railroad vehicle or a suspension of an automobile, with a simple configuration, a performance test or a durability test that is equivalent to an actual vehicle test.

To attain the above objects, according to a first aspect of the invention, there is provided an apparatus for testing a vehicle that runs on a running surface, comprising freely rotatable rotary bodies that simulate the running surface; a mock vehicle having wheels and being provided on the rotary bodies; and a digital computer having storing means for storing a numerical model that is virtually connected to the mock vehicle.

To attain the above objects, according to a second aspect of the invention, there is provided an apparatus for testing a vehicle that runs on rails, comprising first and second rail simulating means each of which simulates rails and has a plurality of freely rotatable rotary bodies; first and second mock vehicles provided on the first and second rail simulating means, respectively, and each having a plurality of rotatable rail wheels; first and second vibrating means for vibrating the first and second mock vehicles, respectively; a digital computer that stores a numerical model of a vehicle body virtually connected to both of the first and second mock vehicles; first and second reaction force measuring means for measuring reaction forces that are exerted on the first and second mock vehicles, respectively; and control means for controlling the first and second vibrating means based on measured reaction force values, respectively, wherein an actual vehicle is simulated by using the first and second mock vehicles and the numerical model.

To attain the above objects, according to a third aspect of the invention, there is provided a method for testing a vehicle that runs on a running surface, comprising the steps of driving a mock running surface; measuring a reaction force generated from a truck; inputting a measured reaction force value to a digital computer; calculating, with the digital computer, a vehicle movement after a lapse of a preset time ($\Delta t$) from a point in time when the reaction force was measured by using the measured reaction force value and a numerical model of a vehicle body that has been input in advance to the digital computer; calculating, with the digital computer, a vibration instruction signal indicating vibration to be applied to a mock vehicle based on the calculated vehicle movement; and driving a vibrator based on the vibration instruction signal after a lapse of the preset time ($\Delta t$).

To attain the above objects, according to a fourth aspect of the invention, there is provided a method for testing a vehicle having a plurality of mock vehicles that runs on rails, comprising the steps of rotating mock rails; measuring reaction forces generated from the respective mock vehicles; inputting measured reaction force values to a digital computer; calculating, with the digital computer, movements of the respective mock vehicles after a lapse of a preset time ($\Delta t$) from a time point when the reaction forces were measured by using the measured reaction force values and a numerical model of a vehicle body that has been input in advance to the digital computer and virtually connected to each of the mock vehicles; calculating, with the digital computer, vibration instruction signals for vibrators for vibrating the mock vehicles based on the calculated vehicle movements, respectively; and driving, with controllers, the vibrators after a lapse of the preset time (Δt) based on the vibration instruction signals, respectively.

Preferably, in the apparatus according to the first aspect of the invention, there are further provided vibrating means for vibrating the mock vehicle; reaction force measuring means for measuring a reaction force that is exerted on the mock vehicle; and control means for controlling the vibrating means, wherein the running surface is rails and the vehicle is a railroad vehicle.

Alternatively, there are further provided vibrating means for vibrating the mock vehicle; reaction force measuring. means for measuring a reaction force that is exerted on the mock vehicle; and control means for controlling the vibrating means based on the measured reaction force so that displacements of the numerical model and the mock vehicle at connecting points thereof coincide with each other, wherein the running surface is a road surface and the vehicle is an automobile.

The digital computer may further comprise time managing means for managing measurement timing of the reaction force measuring means; and vehicle movement calculating means for calculating a vehicle movement after a lapse of a preset time from a point in time when the reaction force was measured by referring to the numerical model, and for generating a vibration signal for the vibrating means.

The digital computer may further comprise output means for outputting the vehicle movement calculated by the vehicle movement calculating means to an external apparatus.

The apparatus may further comprise a driving device for rotationally driving the rotary bodies.

Preferably, the method according to the third aspect of the invention further comprises the step of supplying the movement of the mock vehicle calculated in the movement calculating step to the mock vehicle as a feedback signal.

The method may further comprise the steps of measuring a running distance of the mock vehicle; determining a state of the running surface after a lapse of a preset time from a point in time when the running distance was measured by referring to stored running surface state data by using a measured running distance value; and driving a running surface state simulation vibrator after a lapse of the preset time.

The running surface may be rails and the vehicle may be a railroad vehicle.

As described above, according to the invention, rotary bodies on which a truck is mounted are rotated to simulate rails and a mock vehicle is used that is constructed of a frame and a vibrator. A load that is imposed on the mock vehicle from the truck is measured. A vehicle movement after a lapse of a preset time from a point in time when the load was measured is calculated by using a load measurement value according to a program and a numerical model that have been input in advance to a digital computer. The calculated vehicle movement is realized by using a vibrator after a lapse of the preset time.

The invention enables the digital computer that calculates the vehicle movement to produce, based on the movement calculation result, a signal that is necessary for a control system of an active damper of the truck. Therefore, a test can be conducted under the same conditions as in a case where the truck is joined to an actual vehicle.

DETAILED DESCRIPTION OF THE PREFERRED EMBODIMENTS

Several embodiments of the present invention will be hereinafter described with reference to the accompanying drawings.

Figure 1:
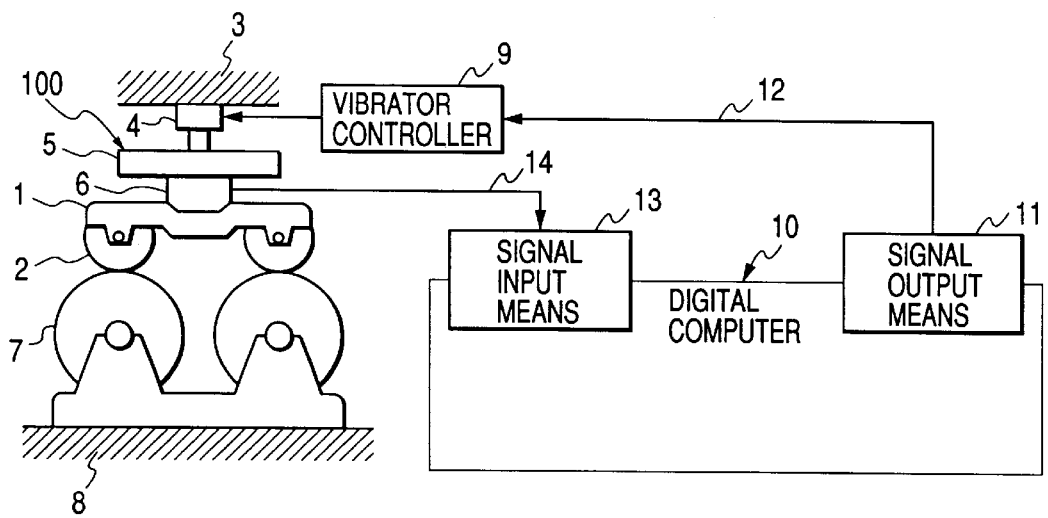
FIG. 1 is a block diagram of a truck testing apparatus according to a first embodiment of the invention.
Figure 12:
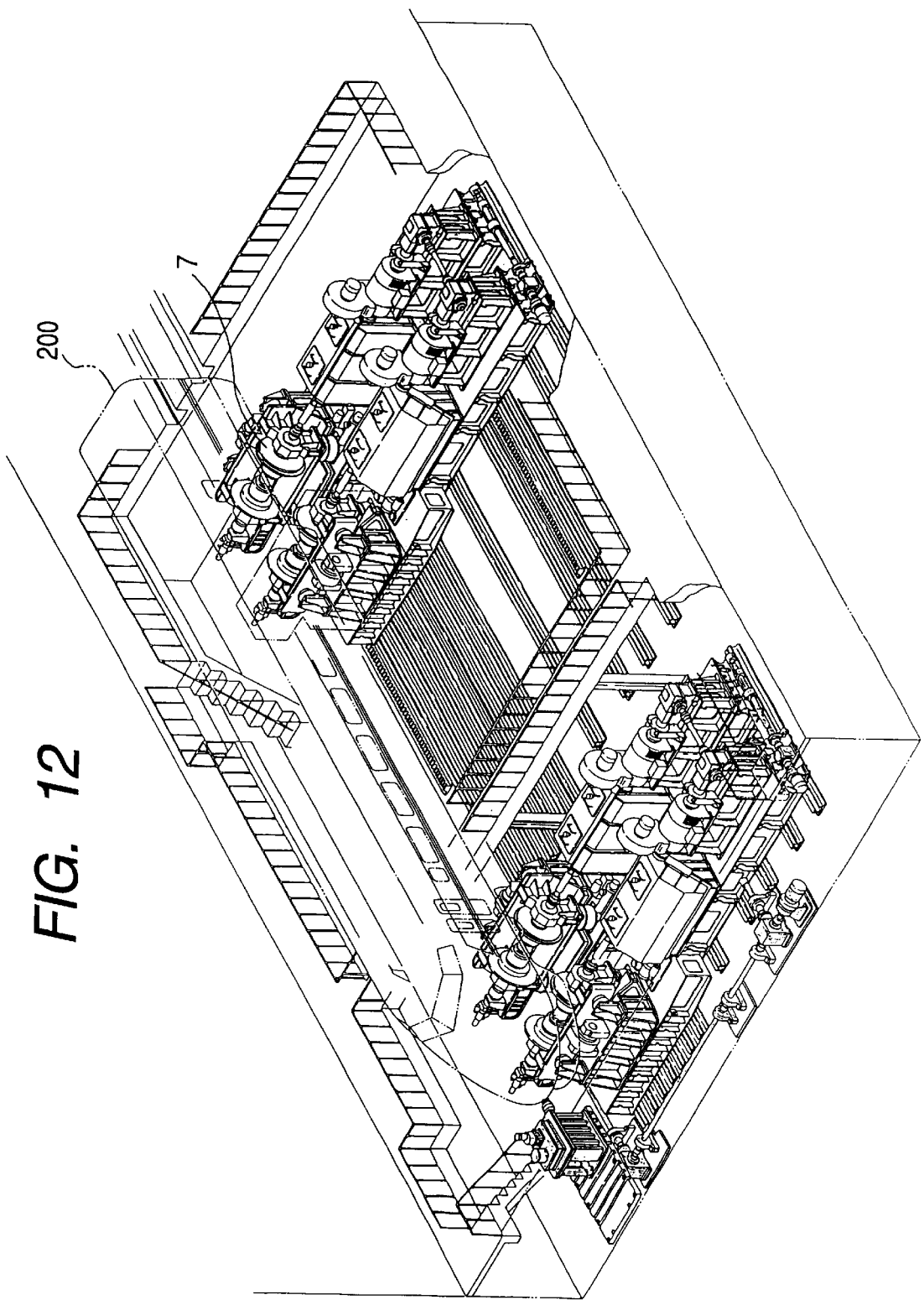
FIG. 12 is a bird's-eye view of the base side of the truck testing apparatus of FIG. 1.

FIG. 1 is a block diagram of a truck testing apparatus according to a first embodiment of the invention, and FIG. 12 is a bird's-eye view of the base side of this testing apparatus. This base side is approximately the same as that of a conventional truck testing apparatus. Although a test vehicle 200 equivalent to an actual vehicle is used conventionally, in the invention most of the information of the test vehicle 200 is stored in a digital computer or a storage device in the form of a numerical model. That is, a numerical model including a vehicle body portion that is input to the digital computer and a mock vehicle 100 that is mounted on a vibrator are virtually connected to each other and are unified to conduct a test.

Wheels 2 are rotatably joined to a truck 1 to be provided in the bottom portion of a railroad vehicle. The wheels 2 are in contact with respective rotary bodies 7 that are rotatably mounted on a base 8 to simulate a running surface. A vibrator 4 is fixed to both of a rigid wall 3 and a frame 5 that is part of the mock vehicle 100. The frame 5 and the truck 1 are mechanically connected to each other via a reaction force measuring device 6. The reaction force measuring device 6 is to measure reaction force that is exerted from the truck 1 to the mock vehicle 100 when the vibrator 4 vibrates the mock vehicle 100. The installation position of the reaction force measuring device 6 is not limited to the position of FIG. 1.

A reaction force value measured by the reaction force measuring device 6 is transmitted to a signal input means 13 via a signal transmitting means 14 and is thereby input to a digital computer 10 which includes the signal input means 13. A signal output means 11 that is provided in the digital computer 10 outputs a vibration signal, which is input to a vibrator controller 9 via a signal transmitting means 12. Based on the vibration signal, the vibrator controller 9 causes the vibrator 4 to drive the mock vehicle 100. In this embodiment, for example, a transmitted signal is a voltage signal and the signal transmitting means 12 and 14 are a cable. The signal input means 13 is an A/D converter and the signal output means 11 is a D/A converter. These components are not limited to those examples and can be modified without departing from the spirit and scope of the invention.

Figure 2:
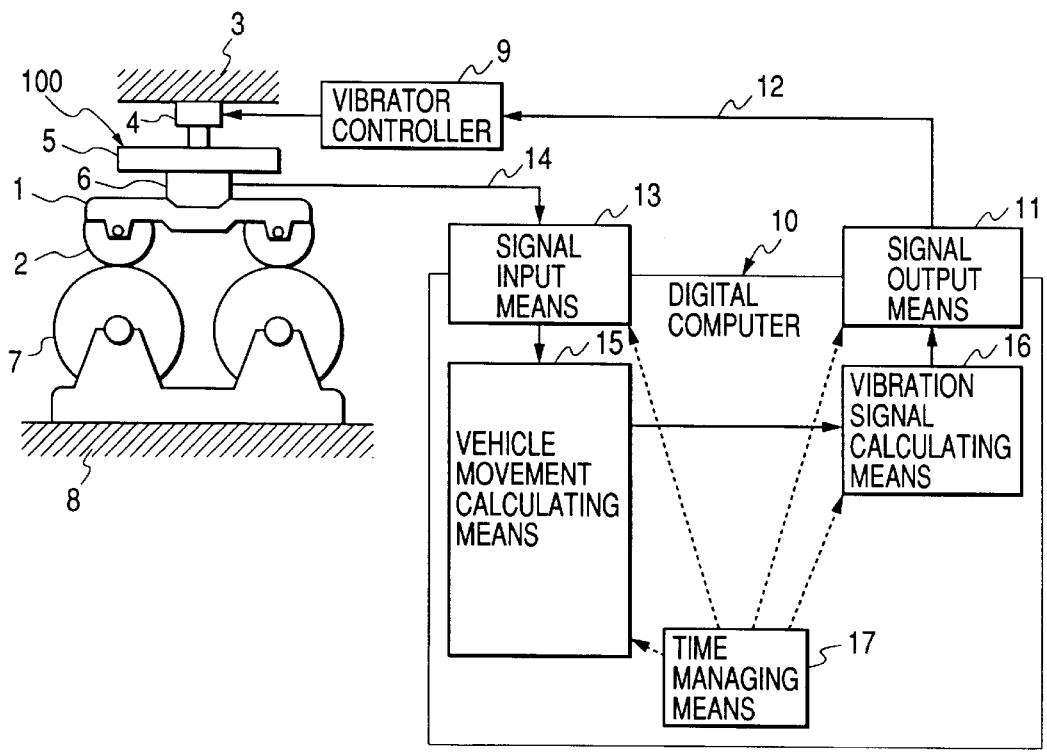
FIG. 2 is a detailed block diagram of FIG. 1.

FIG. 2 shows a specific function of the digital computer 10 shown in FIG. 1. A reaction force measurement value obtained by the reaction force measuring device 6 is input to a vehicle movement calculating means 15 via the signal input means 13. Information on the vehicle portion that is input through an auxiliary device (not shown; for instance, a keyboard) of the digital computer 10 is stored in a storing means of the vehicle movement calculating means 15 in the form of a numerical model, that is coefficient matrices of equations of motion that describe vehicle movement. The numerical model is expressed in such a manner that the body portion of the vehicle is divided into a limited number of elements, and includes data of each element such as its mass, rigidity, and damping performance, data of a connection relationship of the elements, data of position coordinates, and other data. The vehicle movement calculating means 15 numerically integrates the equations of motion of the stored numerical model by using the reaction force measurement value as an external force value, thereby calculating a movement state after a lapse of a preset time Δt from time to when the reaction force was measured. For example, a centered difference method is used as the numerical integration method; however, the invention is not limited to such a case. When receiving a calculation result, a vibration signal calculating means 16 generates an instruction signal to be sent to the vibrator 4 so that the movement of the truck 1 and the vehicle 100 at their contact point after a lapse of the preset time Δt becomes equal to the calculation result of the vehicle movement calculating means 15. The generated instruction signal is output from the signal output means 11. The above function is managed by a time managing means 17. After a lapse, of the preset time Δt, the calculation result of the vehicle movement should coincide with the movement of the actual body being tested.

Figure 3:
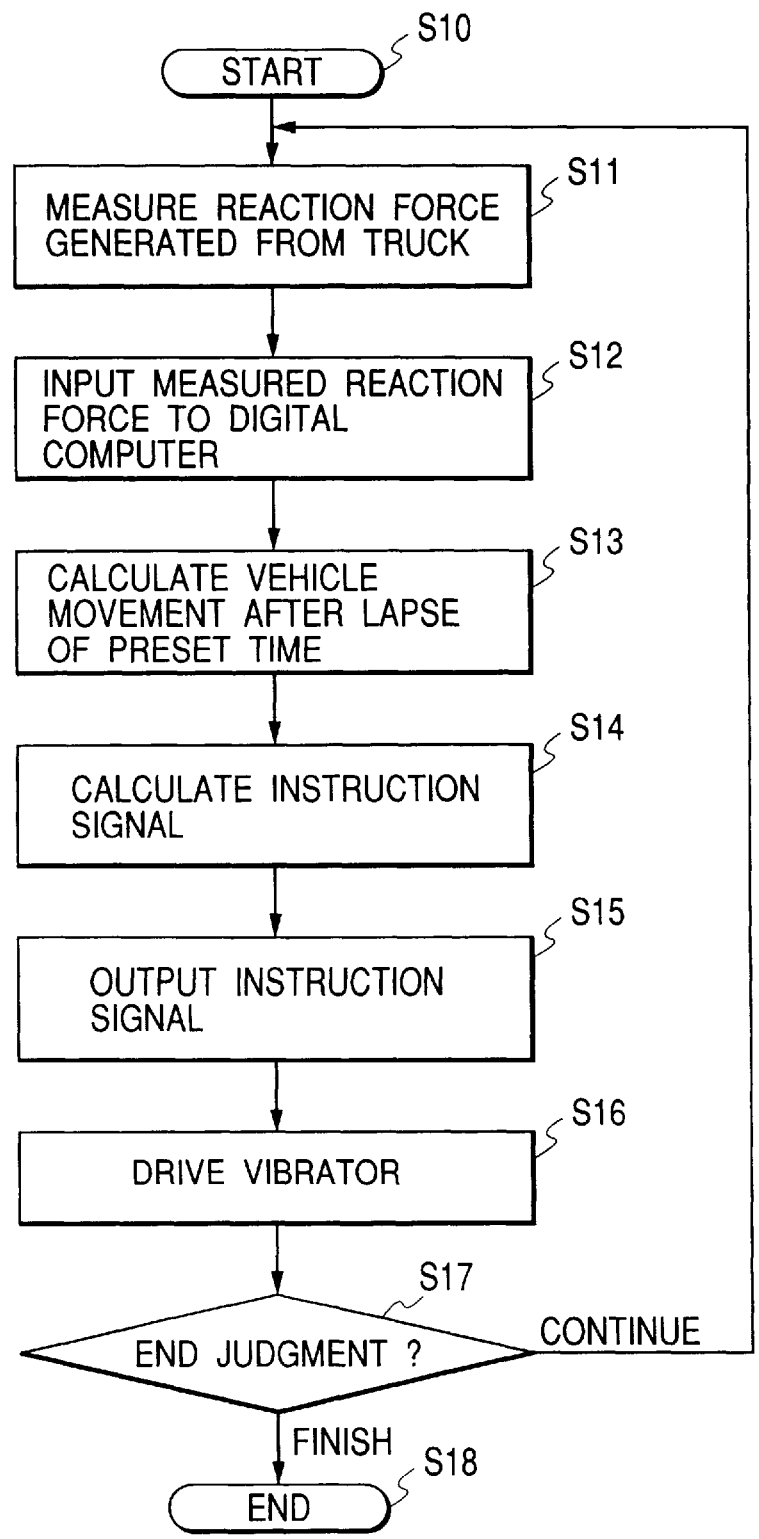
FIG. 3 is a flowchart of a testing method using the truck testing apparatus of FIG. 1.

A testing method procedure of the above-configured truck testing apparatus will be described below with reference to FIG. 3. A specific procedure is as follows.

(0) A test is started (step S10).

(1) The reaction force measuring device 6 measures reaction force generated from the truck 1 (step S11).

(2) A measurement value of the reaction force measuring device 6 is input to the digital computer 10 (step S12).

(3) Based on a vehicle numerical model that has been input in advance to the digital computer 10 and the reaction force measurement value, the digital computer 10 calculates a vehicle movement after a lapse of a preset time Δt from the time when the reaction force was measured (step S13).

(4) Based on a vehicle movement calculation result, the digital computer 10 calculates a vibration instruction signal for realizing the movement state of the mock vehicle 100 portion (step S14)

(5) The signal output means 11 outputs the instruction signal after a lapse of the preset time Δt (step S15).

(6) Based on the instruction signal, the controller 9 drives the vibrator 4 (step S16).

(7) Whether to continue the test is judged (step S17).

(8) The test is finished (step S18).

In the above procedure, whether to continue or finish the test is judged by judging whether a preset time has elapsed or whether the vibrator controller 9 has been given a stop signal. For example, a judging means for this purpose may be provided in a host computer or some other device such as an activation/stop panel.

According to this embodiment, a test that is equivalent to an actual vehicle test can be conducted without the need for running an actual vehicle. Therefore, the function of a truck can be evaluated economically. Further, the performance under various use conditions or vehicle conditions can be evaluated by changing the numerical model of a vehicle.

Figure 4:
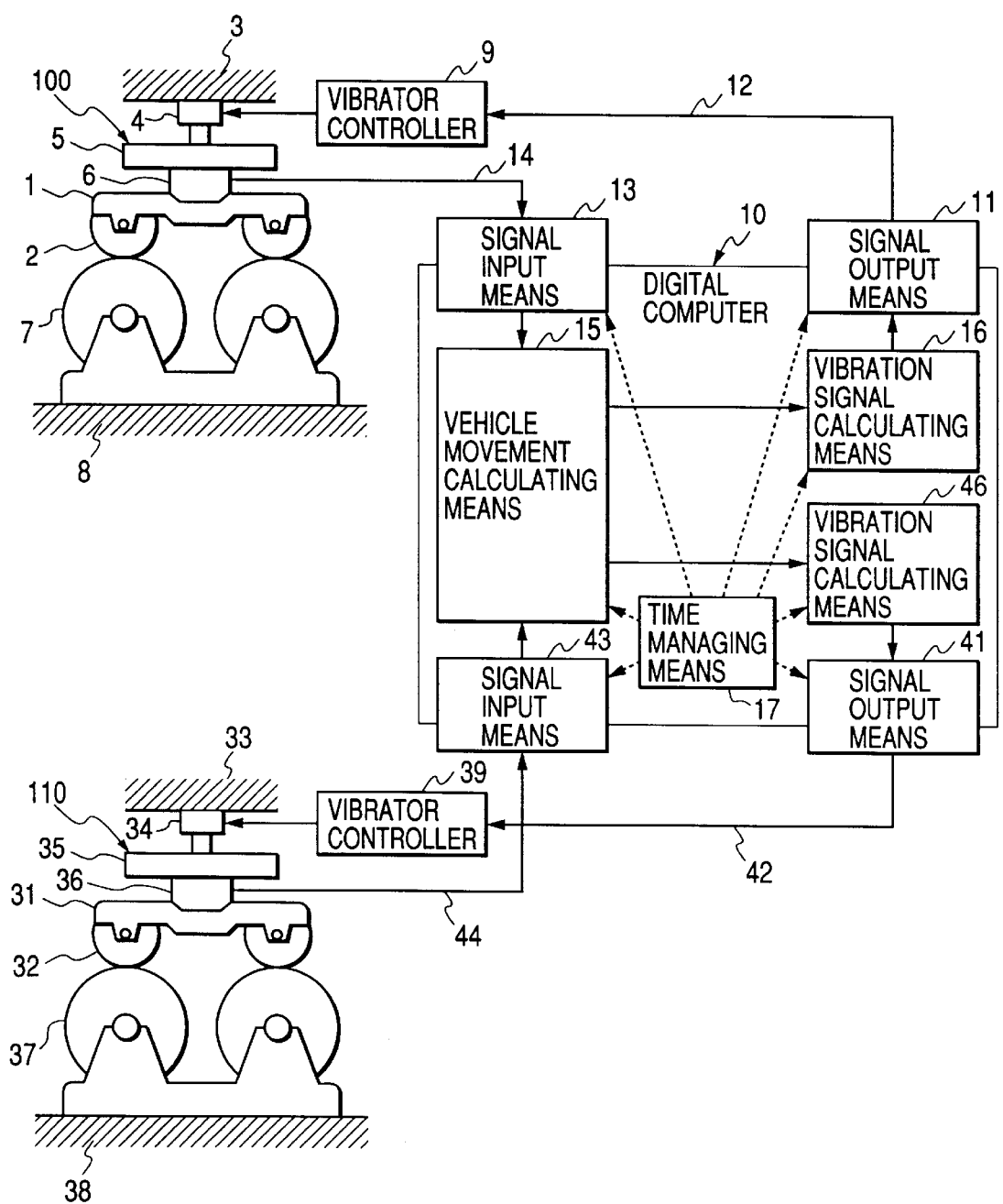
FIG. 4 is a block diagram of a truck testing apparatus according to a second embodiment of the invention.

Next, a second embodiment of the invention will be described with reference to FIG. 4. In this embodiment, another truck, another set of rotary bodies, etc. are added to the components of the first embodiment. That is, another set of a mock vehicle body and mock rails is provided in addition to the one set of a mock vehicle body and mock rails that is provided in the first embodiment. The components of the second set are given reference numerals in which the first places are the same as those of the reference numerals of the corresponding components of the first set, respectively, and second places are 3. The second embodiment is the same as the first embodiment in all other points.

In the second set of components, a plurality of wheels 32 are joined to the bottom portion of a truck 31 and are in contact with respective rotary bodies 37 that are rotatably mounted on a base 38. A vibrator 34 that is fixed to a rigid wall 33 that is provided above the truck 31 is connected to the truck 31 via a reaction force measuring device 36. As in the case of the first embodiment, the reaction force measuring device 36 is to measure reaction force that is exerted on a mock vehicle 110 from the truck 31 when the vibrator 34 vibrates the truck 31. The position of the reaction force measuring device 36 is not limited to the position shown in FIG. 4.

As in the case of the first embodiment, a reaction force measurement value of the reaction force measuring device 6 is input to the digital computer 10 via the signal transmitting means 14 and the signal input means 13. In parallel with this operation, a reaction force measurement value of the reaction force measuring device 36 is input to the digital computer 10 via a signal transmitting means 44 and a signal input means 43. A vibration signal for the vibrator 4 is output from the signal output device 11 of the digital computer 10 and transmitted to the controller 9 of the vibrator 4 via the signal transmitting means 12. On the other hand, a vibration signal for the vibrator 34 is transmitted to a controller 39 of the vibrator 34 via a signal output means 41 and a signal transmitting means 42. The mock vehicles 100 and 110 are driven by the above two respective signals.

Also in this embodiment, transmitted signals are a voltage signal and the signal transmitting means 12, 14, 42, and 44 are cables. The signal input means 13 and 43 are an A/D converter and the signal output means 11 and 41 are a D/A converter. These components are not limited to those examples and can be modified without departing from the spirit and scope of the invention.

In the digital computer 10, reaction force measurement values are input to a vehicle movement calculating means 15 via the signal input means 13 and 43. Information on the vehicle portion that has been input in advance through the auxiliary device (not shown; for instance, a keyboard) of the digital computer 10 is stored in a storing means of the vehicle movement calculating means 15 in the form of a numerical model, that is coefficient matrices of equations of motion that describe vehicle movement. The vehicle movement calculating means 15 numerically integrates the equations of motion of the stored numerical model by using the reaction force measurement values as external force values, thereby calculating a movement state after a lapse of a preset time $\Delta t$ from time t0 when the reaction forces were measured. For example, a centered difference method is used as the numerical integration method; however, the invention is not limited to such a case. When receiving calculation results, vibration signal calculating means 16 and 46 generate instruction signals to be sent to the vibrator 4 and 34 so that the movements of the trucks 1 and 31 and the vehicles 100 and 110 at their contact points become equal to the calculation results of the vehicle movement calculating means 15, respectively. The generated instruction signals are output from the signal output means 11 and 41. The above function is managed by a time managing means 17. After a lapse of the preset time $\Delta t$, the movement calculation results should coincide with the movements of the actual bodies being tested.

In this embodiment, the bases 8 and 38, the rigid walls 3 and 33, the signal input means 13 and 43, the vibration signal calculating means 16 and 46, and the signal output means 11 and 41 each have the same configuration. However, they need not always have the same configuration. The rotary shafts of the rotary bodies 7 may be either common to or different from those of the rotary bodies 37.

Figure 5:
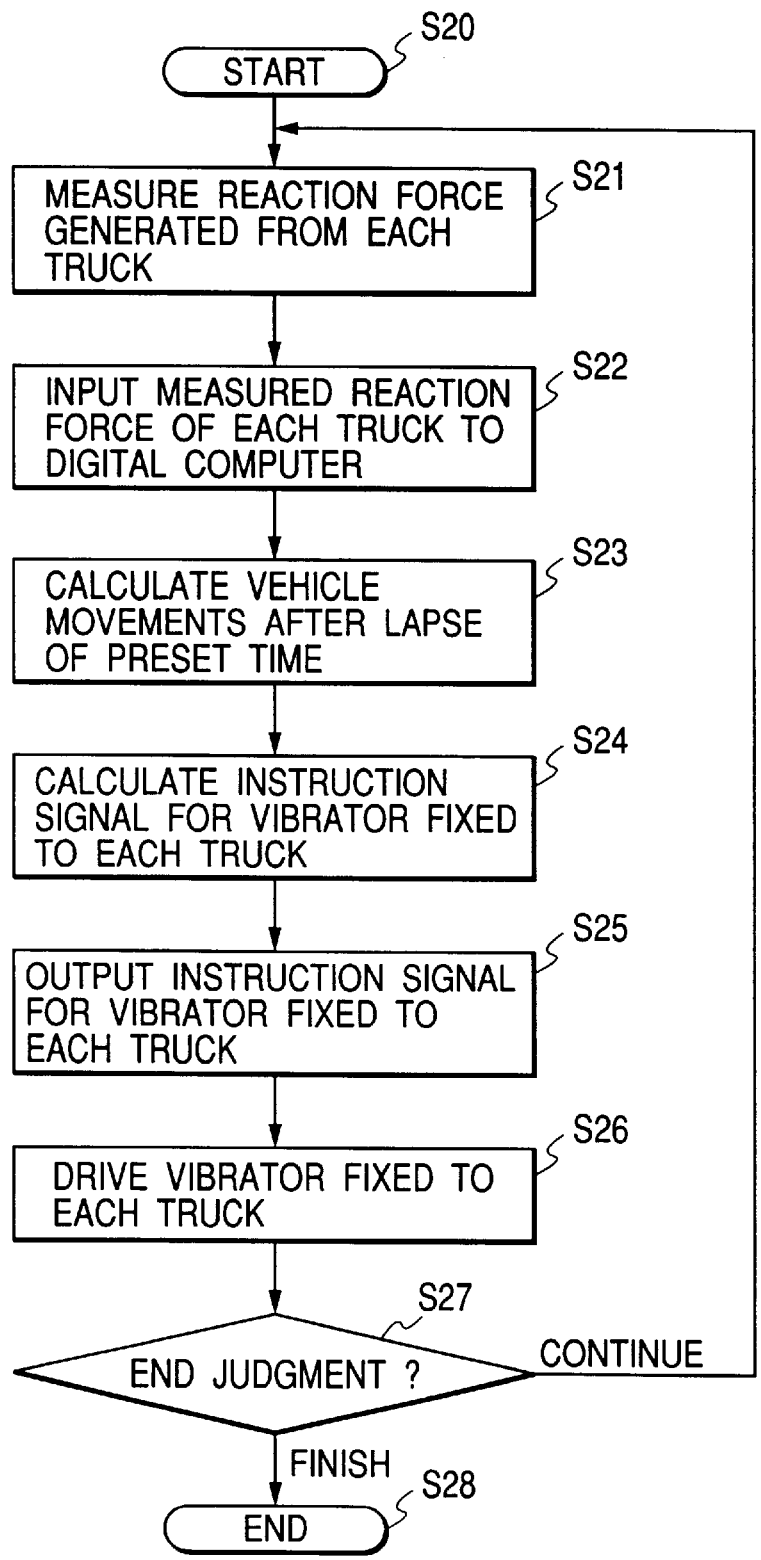
FIG. 5 is a flowchart of a testing method using the truck testing apparatus of FIG. 4.

A specific example of a testing method of the above-configured truck testing apparatus will be described below with reference to FIG. 5.

(0) A test is started (step S20).

(1) The reaction force measuring devices 6 and 36 measure reaction forces generated from the respective trucks 1 (step S21).

(2) Reaction force measurement values of the reaction force measuring devices 6 and 36 are input to the digital computer 10 (step S22).

(3) Based on a vehicle numerical model that has been input in advance to the digital computer 10 and the reaction force measurement values, the digital computer 10 calculates movements of the respective vehicles 100 and 110 after a lapse of a preset time $\Delta t$ from the time when the reaction forces were measured (step S23).

(4) Based on vehicle movement calculation results, the digital computer 10 calculates vibration instruction signals for the vibrators 4 and 34 fixed to the trucks 1 and 31 for realizing the movement states of the mock vehicles 100 and 110, respectively (step S24).

(5) The signal output means 11 and 41 output the instruction signals for the vibrators 4 and 34, respectively, after a lapse of the preset time $\Delta t$ (step S25).

(6) Based on the instruction signals, the controllers 9 and 39 drive the respective vibrators 4 and 34 (step S26).

(7) Whether to continue or finish the test is judged (step S27).

(8) The test is finished (step S28).

As in the case of the first embodiment, whether to continue or finish the test is judged by judging whether a preset time has elapsed or whether the vibrator controllers 9 and 39 have been given a stop signal.

This embodiment provides the following advantages in addition to those of the first embodiment. A highly accurate experiment can be conducted because influences on vehicle movement of trucks that are disposed at the front and rear positions of a vehicle can be tested simultaneously without any limitations from the truck interval of an actual vehicle. Further, a test can also be conducted for a case in which a vehicle is mounted on a plurality of trucks each having different performance.

Figure 6:
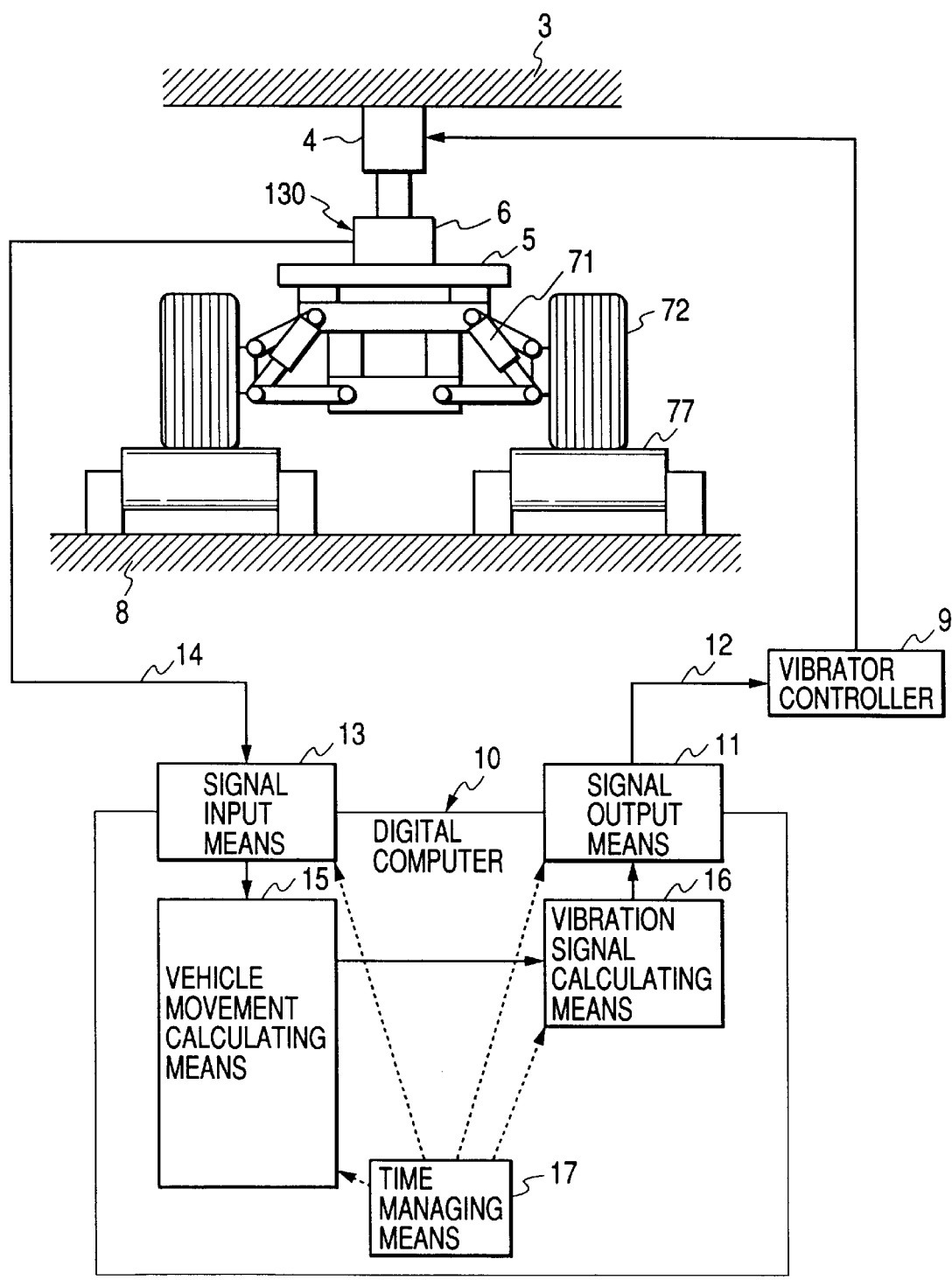
FIG. 6 is a block diagram of a suspension testing apparatus according to a third embodiment of the invention.

FIG. 6 is a block diagram of a truck testing apparatus according to a third embodiment of the invention. This embodiment is different from the first embodiment only in that the truck 1 of the first embodiment is replaced by an automobile suspension 71. Wheels 72 are rotatably joined to the bottom portion of the suspension 71, and are in contact with rotary bodies 77 that are rotatably provided on a base 8. A frame 5 is provided on the top portion of the suspension 71, and is connected, via a reaction force measuring device 6, to the vibrator 4 that is fixed to a rigid wall 3. The wheels 72, the frame 5, the reaction force measuring device 6, and the vibrator 4 constitute a mock vehicle 130. The reaction force measuring device 6 may be of any type as long as it can measure reaction force that is exerted on the mock vehicle 130 from the suspension 71, and its position is not limited to the position shown in FIG. 6. Although in this embodiment the rotary bodies 77 are of a roller type, they may be of a belt type and any means capable of rotationally driving a vehicle can be used. The signal processing system and the control system are the same as in the first embodiment.

Figure 7:
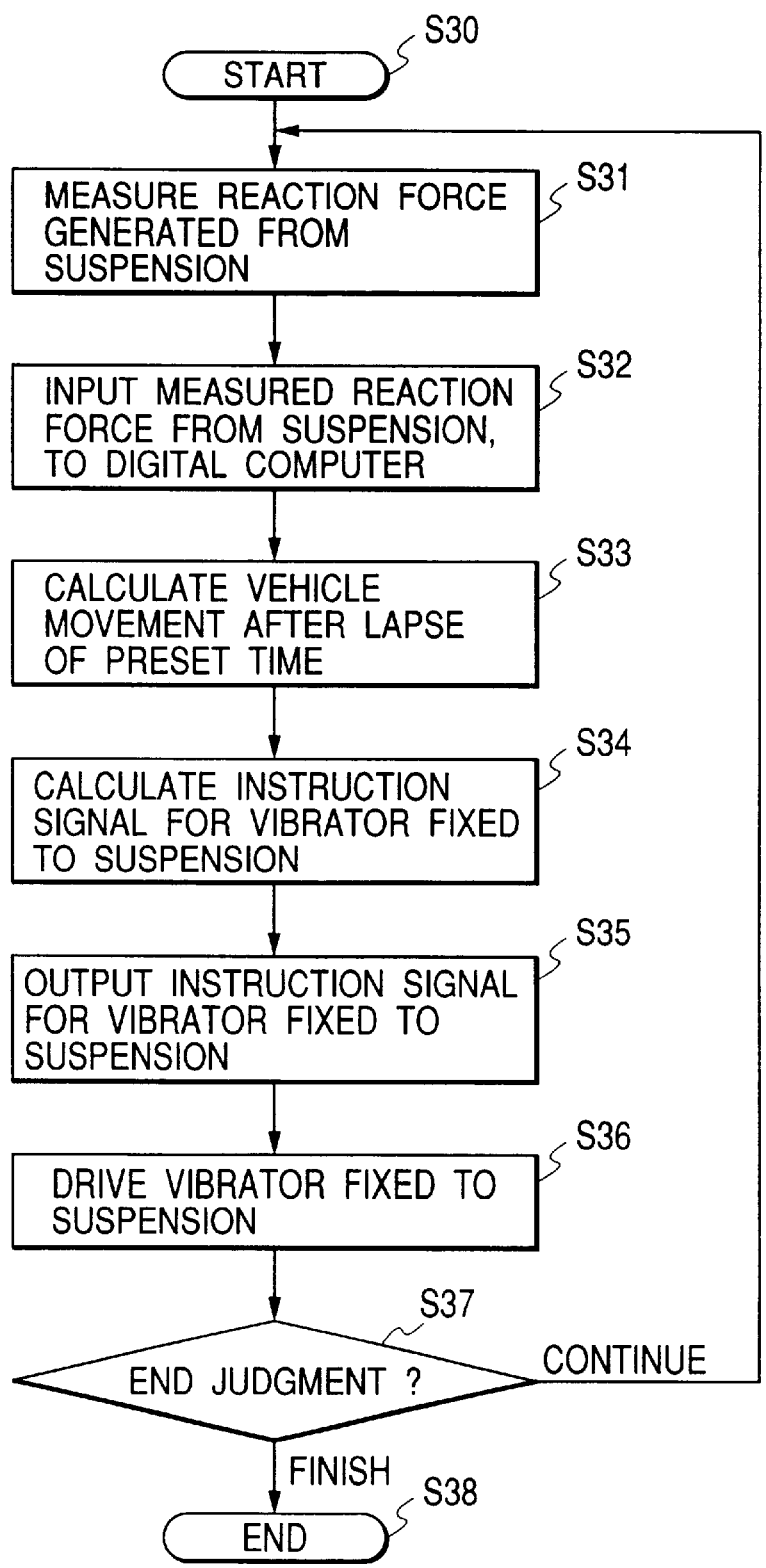
FIG. 7 is a flowchart of a testing method using the truck testing apparatus of FIG. 6.

A procedure of a testing method of the above-configured suspension testing apparatus will be described below with reference to FIG. 7.

(0) A test is started (step S30).

(1) The reaction force measuring device 6 measures reaction force generated from the suspension 71 (step S31).

(2) A reaction force measurement value of the reaction force measuring device 6 is input to the digital computer 10 (step S32).

(3) Based on a vehicle numerical model that has been input in advance to the digital computer 10 and the reaction force measurement value, the digital computer 10 calculates a vehicle movement after a lapse of a preset time $\Delta t$ from the time when the reaction force was measured (step S33).

(4) Based on a vehicle movement calculation result, the digital computer 10 calculates a vibration instruction signal for the vibrator 4 for realizing the movement state of the mock vehicle 130 portion (step S34).

(5) The signal output means 11 outputs the instruction signal for the vibrator 4 after a lapse of the preset time $\Delta t$ (step S35).

(6) Based on the instruction signal from the signal output means 11, the controller 9 drives the vibrator 4 that is fixed to the suspension 71 (step S36).

(7) Whether to continue or finish the test is judged (step S37).

(8) The test is finished (step S38).

According to this embodiment, a test that is equivalent to an actual vehicle running test can be conducted without the need for running an actual automobile. Therefore, the function of a suspension can be evaluated economically. Further, the performance under various use conditions or vehicle conditions can be evaluated merely by changing the numerical model of an automobile.

Figure 8:
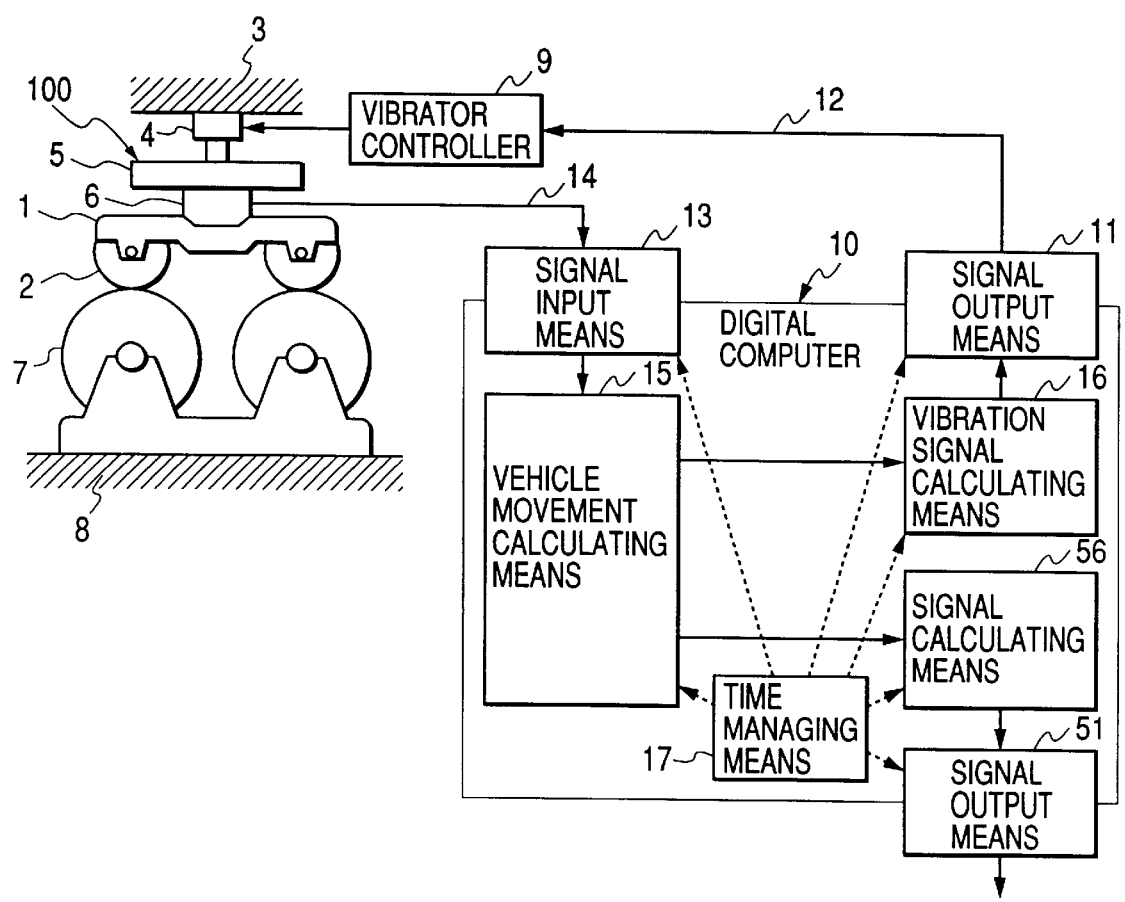
FIG. 8 is a block diagram of a truck testing apparatus according to a fourth embodiment of the invention.

FIG. 8 shows a truck testing apparatus according to a fourth embodiment of the invention. This embodiment is different from the first embodiment only in the configuration of the digital computer 10. That is, in this embodiment, the digital computer 10 has, in addition to the vibration signal calculating means 16 and the signal output means 11, a signal calculating means 56 and a signal output means 51. The signal calculating means 56 and the signal output means 51 serve to output a vehicle movement calculation result to an external system. The signal calculating means 56 and the signal output means 51 may have the same configurations as the vibration signal calculating means 16 and the signal output means 11, respectively. In the same manner as in the first embodiment, the signal calculating means 56 and the signal output means 51 are managed by the time managing means 17 and output, after a lapse of a preset time, a calculation result for a point in time after a lapse of the preset time. Since this embodiment is the same as the first embodiment except the above points, method a testing method is not described.

According to this embodiment, since the same state as would be detected by measuring the vehicle movement by attaching a sensor to an actual vehicle can be simulated, the performance of a truck can be evaluated without using an actual vehicle. Further, in the case of a truck mounted with an active damper or the like that requires that the movement state of a vehicle be received as a feedback signal, an external output signal of this embodiment can be used as such a feedback signal. Although in this embodiment an external output signal is additionally generated in the case of the first embodiment, it may also be additionally generated in the case of the second or third embodiment.

Figure 9:
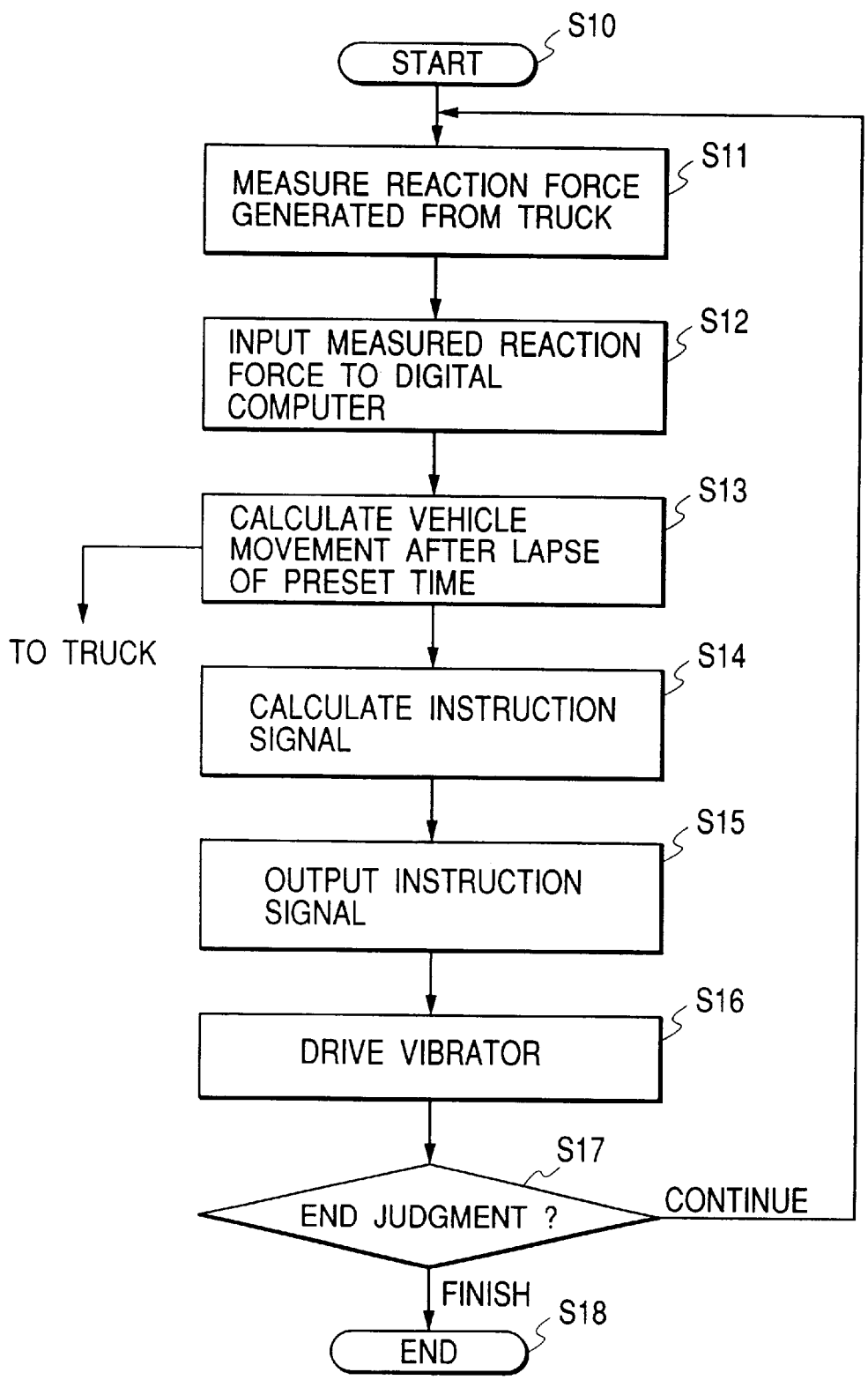
FIG. 9 is a flowchart showing another testing method using the truck testing apparatus of FIG. 1.

In each of the above embodiments, after the fourth step (S13, S23, or S33) of driving the mock vehicle, a vehicle movement calculation result may be output after a lapse of the present time and used as a feedback signal to the truck as the test subject. FIG. 9 shows a testing method in which this step is added to the testing method of the first embodiment. In this case, the performance of the truck can be tested while the movement state is fed back to the truck, without the need for conducting an actual vehicle test.

Figure 10:
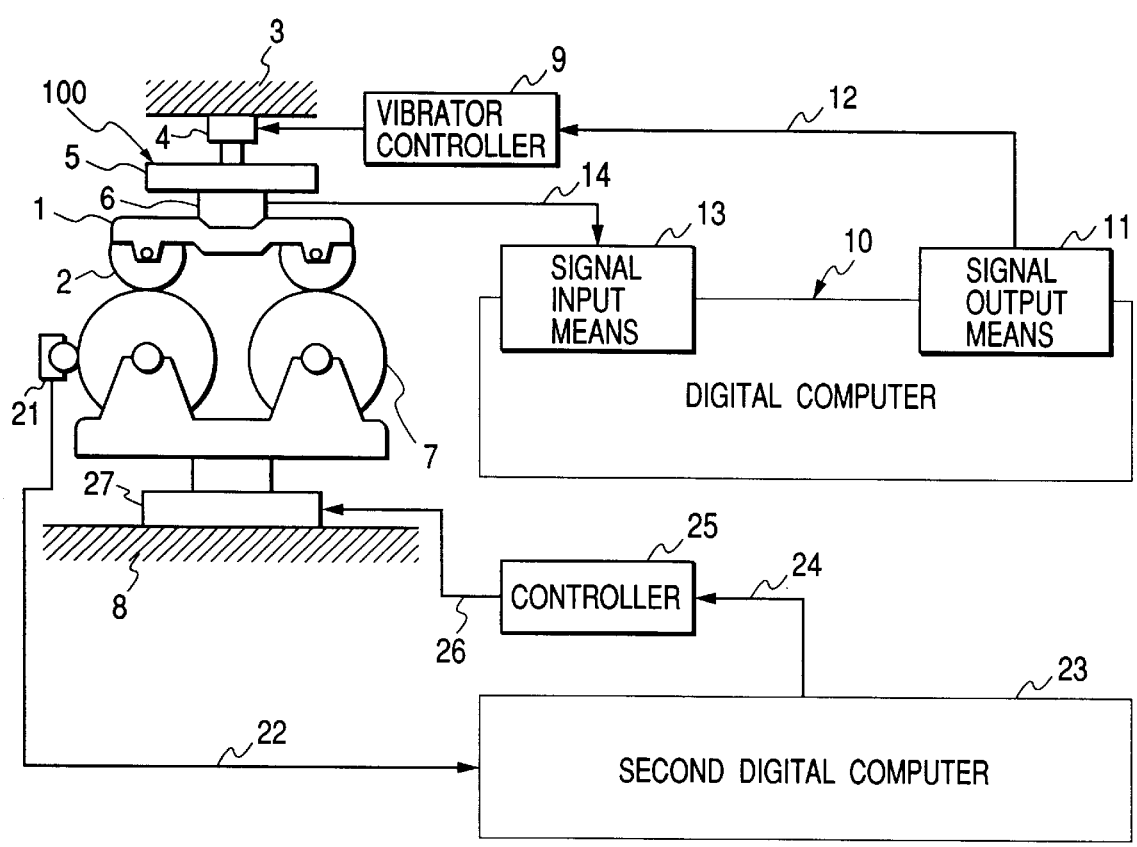
FIG. 10 is a block diagram of a truck testing apparatus according to another embodiment of the invention.
Figure 11:
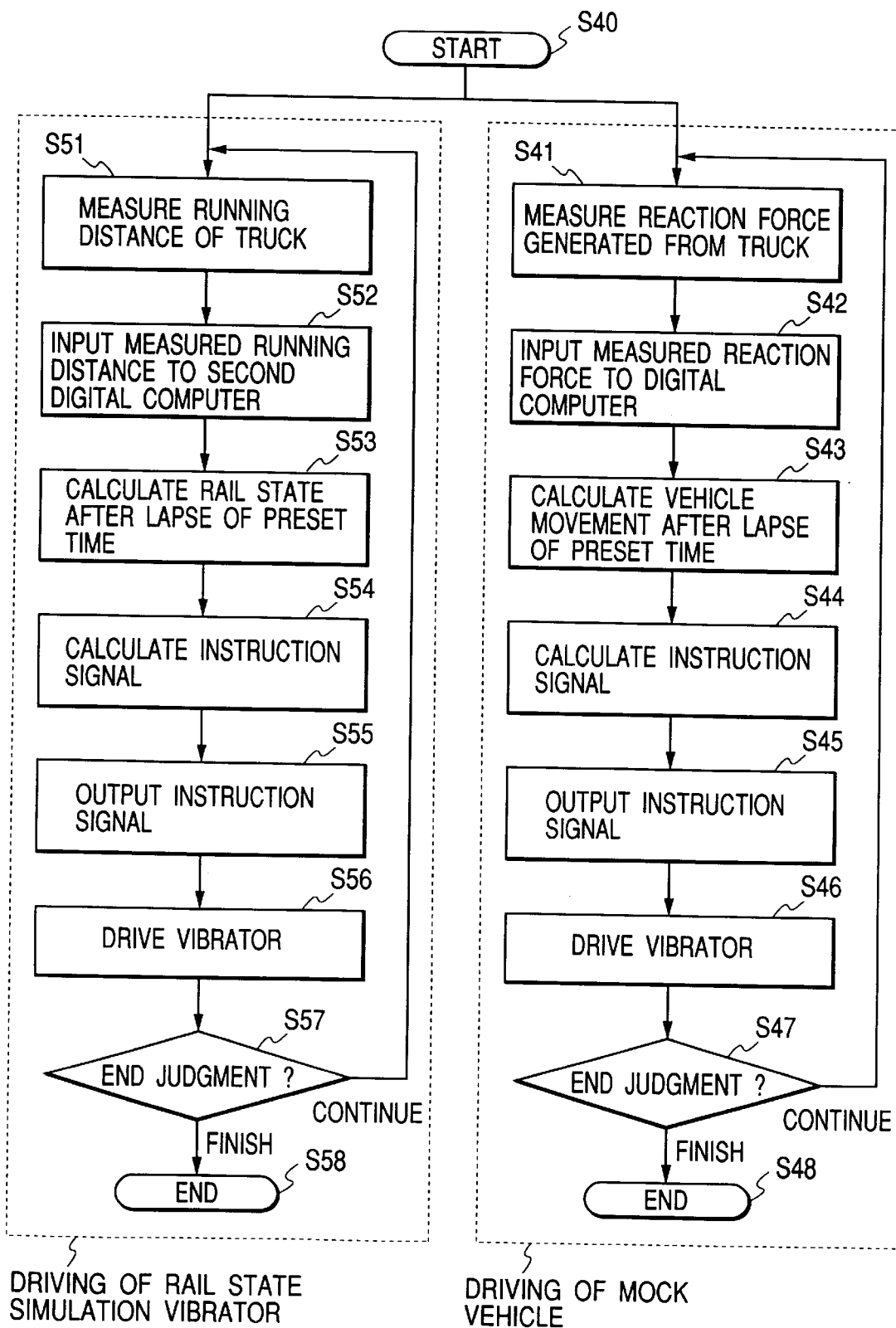
FIG. 11 is a flowchart of a testing method using the truck testing apparatus of FIG. 10.

Another embodiment of the invention will be described below with reference to FIGS. 10 and 11. A truck testing apparatus of this embodiment is such that a rail state simulation vibrator and other components are added to the truck testing apparatus of the first embodiment. The rotary bodies 7 are supported by a rail state simulation vibrator 27. A running distance of the truck 1 detected by a running distance detecting means 21 is input to a second digital computer 23 via a signal transmitting means 22. The second digital computer 23 calculates a vibration signal indicating a gradient and an inclination that should be applied to the rotary bodies 7 from the rail state simulation vibrator 27 by referring to stored rail state data that is a function of the running distance by using the detected running distance. The calculated vibration signal is input to a controller 25 for the rail state simulation vibrator 27 via a signal transmitting means 24 to drive the rail state simulation vibrator 27.

A testing method of the above-configured truck testing apparatus will be described below with reference to FIG. 11. Steps S40–S48 are the same as steps S10–S18 of the first embodiment shown in FIG. 3.

(0) A test is started (step S40).
(1) The reaction force measuring device 6 measures reaction force generated from the truck 1 (step S41).
(2) A measurement value of the reaction force measuring device 6 is input to the digital computer 10 (step S42).
(3) Based on a vehicle numerical model that has been input in advance to the digital computer 10 and the reaction force measurement value, the digital computer 10 calculates a vehicle movement after a lapse of a preset time At from the time when the reaction force was measured (step S43).
(4) Based on a vehicle movement calculation result, the digital computer 10 calculates a vibration instruction signal for realizing the movement state of the mock vehicle 100 portion (step S44).
(5) The signal output means 11 outputs the instruction signal after a lapse of the preset time $\Delta t$ (step S45).
(6) Based on the instruction signal, the controller 9 drives the vibrator 4 (step S46).
(7) Whether to continue the test is judged (step S47).
(8) The test is finished (step S48).

In parallel with the above process, a truck test is conducted according to the following procedure.

(1) A running distance of the truck 1 is detected (step S51).
(2) A running distance measurement value is input to the second digital computer 23 (step S52).
(3) The second digital computer 23 calculates a rail state after a lapse of a preset time by referring to rail state data stored in the second computer 23 by using the measured running distance (step S53).
(4) The second digital computer 23 calculates a vibration instruction signal for realizing the rail state based on a rail state calculation result (step S54).
(5) The second digital computer 23 outputs an instruction signal after a lapse of the preset time (step S55).
(6) The controller 25 drives the rail state simulation vibrator 27 based on the instruction signal (step S56).
(7) Whether to finish the test is judged (step S57).
(8) The test is finished (step S58).

According to this embodiment, a test that is equivalent to a test in which a vehicle is run on actual rails can be conducted without the need for running a vehicle on actual rails. That is, a running test for an actual railroad section between Tokyo and Hakata, for instance, can be simulated with high accuracy if rail state data of that section is stored in advance. Therefore, a running test can be conducted economically, and experimental data can be obtained more easily than a field test with which experimental data is difficult to obtain. Further, experimental data for a different railroad section can easily be obtained merely by changing the rail state data.

Although in each of the above embodiments the entire truck as the subject body is vibrated, only part of a truck, such as only wheels of the truck and their suspensions, may be made as the subject body to be vibrated. On the other hand, part of a vehicle to which a truck is to be joined may be included in a subject body.

Although each of the above embodiments employs a one-axis vibrator, the invention is not limited to such a case. It is desirable to effect vibration of plural degrees of freedom by using a plurality of vibrators when necessary, to realize vehicle movement that is determined by a numerical model. In short, the vibrator may take various forms without departing from the spirit and scope of the invention.

In the invention, while a truck mounted on rotary bodies is rotationally driven, it is vibrated with a vibrator. On the other hand, a vibration response of a vehicle during its running as calculated by using a numerical model of a vehicle body portion that is virtually connected to the truck. Therefore, a vibration response of a vehicle can be tested in a simple manner with high accuracy. Since a modification to a vehicle body portion can be effected merely by changing the numerical model, performance tests or durability tests on a truck under various conditions can be conducted easily.

What is claimed is:

1. A vibration testing apparatus for testing a vehicle using a mock vehicle that runs on a running surface and a numerical model of a vehicle body combined virtually therewith, comprising:

freely rotatable rotary bodies that simulate the running surface for the mock vehicle provided thereon;

vibrating means for vibrating the mock vehicle;

reaction force measuring means for measuring a reaction force that is exerted on the mock vehicle; and a digital computer having storing means for storing the numerical model of the vehicle body that is virtually connected to the mock vehicle, wherein said digital computer calculates the vehicle movement using the reaction force value measured by said reaction force measuring means and the numerical model of the vehicle body stored in the storing means, and calculates a vibration control signal for said vibrating means based on the calculated vehicle movement.

2. The apparatus according to claim 1, further comprising:

control means for controlling said vibrating means, wherein the running surface is formed by rails and the vehicle is a railroad vehicle, and said digital computer outputs the vibration control signal to said control means.

3. The apparatus according to claim 2, wherein the digital computer further comprises:

time managing means for managing measurement timing of the reaction force measuring means; and vehicle movement calculating means for calculating a vehicle movement after a lapse of a preset time from a point in time when the reaction force was measured by referring to the numerical model, and for generating a vibration signal for the vibrating means.

4. The apparatus according to claim 3, wherein the digital computer further comprises output means for outputting the vehicle movement calculated by the vehicle movement calculating means to an external apparatus.

5. The apparatus according to claim 1, further comprising:

control means for controlling said vibrating means so that displacements of the numerical model and the mock vehicle at connecting points thereof coincide with each other, wherein the running surface is a road surface and the vehicle is an automobile, and said digital computer outputs the vibration control signal to said control means.

6. The apparatus according to claim 1, further comprising a driving device for rotationally driving the rotary bodies.

7. A vibration testing apparatus for testing a vehicle that runs on rails, comprising:

first and second rail simulating means each of which simulates rails and has a plurality of freely rotatable rotary bodies;

first and second mock vehicles provided on the first and second rail simulating means, respectively, and each having a plurality of rotatable rail wheels;

first and second vibrating means for vibrating the first and second mock vehicles, respectively;

a digital computer that stores a numerical model of a vehicle body virtually connected to both of the first and second mock vehicles;

first and second reaction force measuring means for measuring reaction forces that are exerted on the first and second mock vehicles, respectively; and control means for controlling said first and second vibrating means so that displacements of the numerical model and the mock vehicle at connecting points thereof coincide with each other, wherein said digital computer calculates the vehicle movement using the reaction force value measured by said first and second reaction force measuring means and the numerical model of the vehicle body stored therein, and calculates a vibration control signal for said first and second vibrating means based on the calculated vehicle movement.

8. A method for testing a vehicle that runs on a running surface, the vehicle having a mock vehicle and a numerical model of a vehicle body connected to the mock vehicle, comprising the steps of:

driving a mock running surface;

measuring a reaction force generated from the mock vehicle;

inputting a measured reaction force value to a digital computer;

calculating, with the digital computer, a vehicle movement after a lapse of a preset time from a point in time when the reaction force is measured by using the measured reaction force value and the numerical model of the vehicle body input in advance to the digital computer;

calculating, with the digital computer, a vibration instruction signal indicating vibration applied to the mock vehicle based on the calculated vehicle movement; and driving a vibrator based on the vibration instruction signal after a lapse of the preset time.

9. The method according to claim 8, further comprising the step of supplying the movement of the vehicle calculated in the movement calculating step to the mock vehicle as a feedback signal.

10. The method according to claim 8, further comprising the steps of:

measuring a running distance of the mock vehicle;

determining a state of the running surface after a lapse of a preset time from a point in time when the running distance is measured by referring to stored running surface state data by using a measured running distance value; and driving a running surface state simulation vibrator after a lapse of the preset time.

11. The method according to claim 8, wherein the running surface is rails and the vehicle is a railroad vehicle.

12. A method for testing a vehicle having a plurality of mock vehicles that runs on rails and a numerical model of a vehicle body, comprising the steps of:

rotating mock rails;

measuring reaction forces generated from the respective mock vehicles;

inputting measured reaction force values to a digital computer;

calculating, with the digital computer, movements of the respective mock vehicles after a lapse of a preset time from a point in time when the reaction forces are measured by using the measured reaction force values and the numerical model of the vehicle body input in advance to the digital computer and virtually connected to each of the mock vehicles;

calculating, with the digital computer, vibration instruction signals for vibrators for vibrating the mock vehicles based on the calculated vehicle movements so that displacements of the numerical model and the mock vehicle at connecting points thereof coincide with each other; and driving, with controllers, the vibrators after a lapse of the preset time based on the vibration instruction signals.

* * * * *